United States Patent [19]

Rudich, Jr.

[11] Patent Number: 5,178,053

[45] Date of Patent: Jan. 12, 1993

[54] ELECTRONIC PILOT POSITIONER

[75] Inventor: George Rudich, Jr., Cedarburg, Wis.

[73] Assignee: Johnson Service Company, Milwaukee, Wis.

[21] Appl. No.: 835,288

[22] Filed: Feb. 13, 1992

[51] Int. Cl.⁵ .............................. F15B 13/16
[52] U.S. Cl. ......................... 91/361; 91/459
[58] Field of Search ............ 91/361, 363 R, 363 A, 91/459, 362; 60/459

[56] References Cited

U.S. PATENT DOCUMENTS

| | | | |
|---|---|---|---|
| 3,664,234 | 5/1972 | Simons et al. | 91/363 R |
| 3,899,915 | 8/1975 | William, Jr. et al. | 73/1 B |
| 3,958,492 | 5/1976 | Curless | 91/363 R |
| 4,121,504 | 10/1978 | Nowak | 91/363 R |
| 4,794,845 | 1/1989 | Vick | 91/459 X |
| 4,865,389 | 9/1989 | Martin | 91/459 X |
| 5,065,663 | 11/1991 | Stadler et al. | 91/459 |

FOREIGN PATENT DOCUMENTS

| | | | |
|---|---|---|---|
| 3339097 | 6/1984 | Fed. Rep. of Germany | 91/361 |
| 0038875 | 4/1978 | Japan | 91/361 |
| 0103102 | 8/1980 | Japan | 91/361 |
| 0769117 | 10/1980 | U.S.S.R. | 91/361 |

OTHER PUBLICATIONS

Keystone Valve USA Inc., Instruction Manual for Keystone "ZACK" Positioner, 1988.

Primary Examiner—Edward K. Look
Assistant Examiner—Hoang Nguyen
Attorney, Agent, or Firm—Foley & Lardner

[57] ABSTRACT

A positioner for use in pneumatic systems moves a pneumatic operator. The positioner is an electronic pilot positioner or electronic to pneumatic interface which provides accurate positioning of linear actuators in response to an electronic control signal. The actuator is moved as pneumatic fluid is exhausted or supplied through the exhaust valve and supply valve. The positioner utilizes two solenoids for controlling a supply valve and an exhaust valve. The positioner includes a control circuit which receives a signal from a central controller and a signal from a feedback circuit. The control circuit compares the feedback signal and the controller signal and generates a signal for positioning the actuator.

19 Claims, 5 Drawing Sheets

ELECTRONIC PILOT POSITIONER

BACKGROUND OF THE INVENTION

The present invention generally relates to control systems which move operators. The present invention more particularly relates to a pilot positioner and method for use in HVAC systems which provide accurate positioning of linear actuators in response to a control signal.

Actuators are generally used as operators to provide mechanical motion for various types of components in a system. In an HVAC system, actuators generally open and close pipes or intakes. The actuator is generally connected to a valve or damper and provides linear motion. By linearly moving the actuator, the valve or damper is moved. The valve or damper controls the amount of fluid traveling within a pipe or intake. A pneumatic operator such as a pneumatic actuator provides an output movement in response to a pneumatic input.

A pilot positioner is an apparatus which is generally connected to an actuator to provide more accurate positioning of the actuator. The positioner compares the output position with an input signal and readjusts the actuator in order to more accurately control the position of the actuator.

In the prior art, there are various ways to control valves and dampers with actuators. Totally pneumatic systems are found in the HVAC systems of commercial buildings throughout the United States. These systems rely on compressors in communication with pneumatic actuators and pneumatic pilot positioners such as the D9502 manufactured by Johnson Controls, Inc. The actuators are moved in response to various pneumatic controls as, for example, pneumatic thermostats. The pneumatic positioner receives a first position indicative signal from the actuator and a second pneumatic signal from the pneumatic control. The positioner outputs a third pneumatic signal to control the actuator. The actuator moves to a particular position in response to the third signal. The pneumatic positioner adjusts the position of the actuator by providing the third pneumatic signal in accordance with the first position indicative and second pneumatic signals.

Another type of system for controlling valves and dampers is a totally electronic system. These systems rely on electric actuators. In these systems, the actuator is generally a solenoid, motor, or other electric transducer which positions the damper or valve in accordance with electronic control signals. Over the last two years, digital computer controllers have become popular in new buildings because they are more efficient and more accurate. These systems appeared in the United States only recently, when electronic controllers became cost effective. A problem with electronic controllers is that they are not readily usable in pneumatic systems.

Recently, electronic controllers have been used with pneumatic systems. This hybrid of electric and pneumatic systems requires an electric to pneumatic interface. Electric to pneumatic interfaces are used so that the more accurate electronic controllers can be used with pneumatic systems. These prior art interfaces use electric to pneumatic transducers to convert the electrical signal to a pneumatic signal which is then applied to the pneumatic actuator. Due to the variation in pickup and full stroke pressure on the pneumatic actuators and also the load compliance of pneumatic actuators, many of these applications require the use of pneumatic pilot positioners to position the actuator. Thus, the hybrid system requires an electric to pneumatic interface and a pneumatic positioner in order to position the actuator.

At least three problems exist with respect to employing an electric to pneumatic interface. First, when installing an electric/pneumatic system or retrofitting a pneumatic system with an electronic controller, the pneumatic pipes must be opened in order to install the interfaces. Therefore, two trades are required to make the interconnection. Steam fitters or pipe fitters must be employed to connect the pneumatic system, and electricians must be employed to connect the electronic system. Bringing two subcontractors to a commercial installation is generally more expensive than bringing one subcontractor to a commercial installation. Second, pneumatic actuators are not able to provide the same positioning accuracy as electric actuators. Therefore, pneumatic positioners and interfaces are too inaccurate to exploit the superior accuracy of electronic control systems. Third, interface devices require additional mounting space in the control panel. The increased surface areas or footprints increase costs and critical area requirements for the controller as well as the entire system.

Thus, there is a need for an interface that can be readily interconnected to existing linear pneumatic actuators and which provides accurate positioning operations. Further, there is a need for an interface which can be readily connected to existing pneumatic actuators with minimal changes to existing pipes. Further still, there is a need for an interface for use with a pneumatic actuator which does not require the mounting of another device in the control panel.

SUMMARY OF INVENTION

The present invention provides an electric to pneumatic interface system or an electronic pilot positioner. The positioner comprises a feedback mechanism which converts the actual actuator position into an electronic signal, an electronic transducer which can control the position of the actuator in response to an electronic control signal, and an electronic control circuit which can generate an electronic control signal in response to a comparison of the requested position and the actual position.

The present invention also provides an electronic pilot positioner for use with a linear actuator. The positioner comprises a solenoid for effecting a valve in response to a control signal, a feedback device in communication with the actuator, and a control circuit which generates the control signal in response to the signal from the feedback device and a second signal.

The present invention also provides an electronic pilot positioner for adjusting the position of an actuator in accordance with a position signal from an electronic controller. The pilot positioner comprises a first and second solenoid mechanically connected to an exhaust valve and a supply valve, respectively, a potentiometer which has a wiper mechanically connected to an output shaft of the actuator, and a control circuit which generates control signals for the first and second solenoids in response to a comparison between the actual position of the actuator and the position signal.

The present invention also provides for a method for positioning an actuator which is connected to a pneumatic line. The method includes receiving a first electronic control signal indicative of a first position, receiving a second electronic control signal indicative of a second position, generating a third electronic control signal indicative of the first and second signals, and adjusting fluid in the pneumatic line in response to the third signal so that the actuator is positioned.

The present invention also provides for a positioner which adjusts the position of an actuator by adjusting a pneumatic signal at a pneumatic output in accordance with a signal from a feedback circuit and an electronic control signal.

DESCRIPTION OF THE INVENTION

Figure 1:
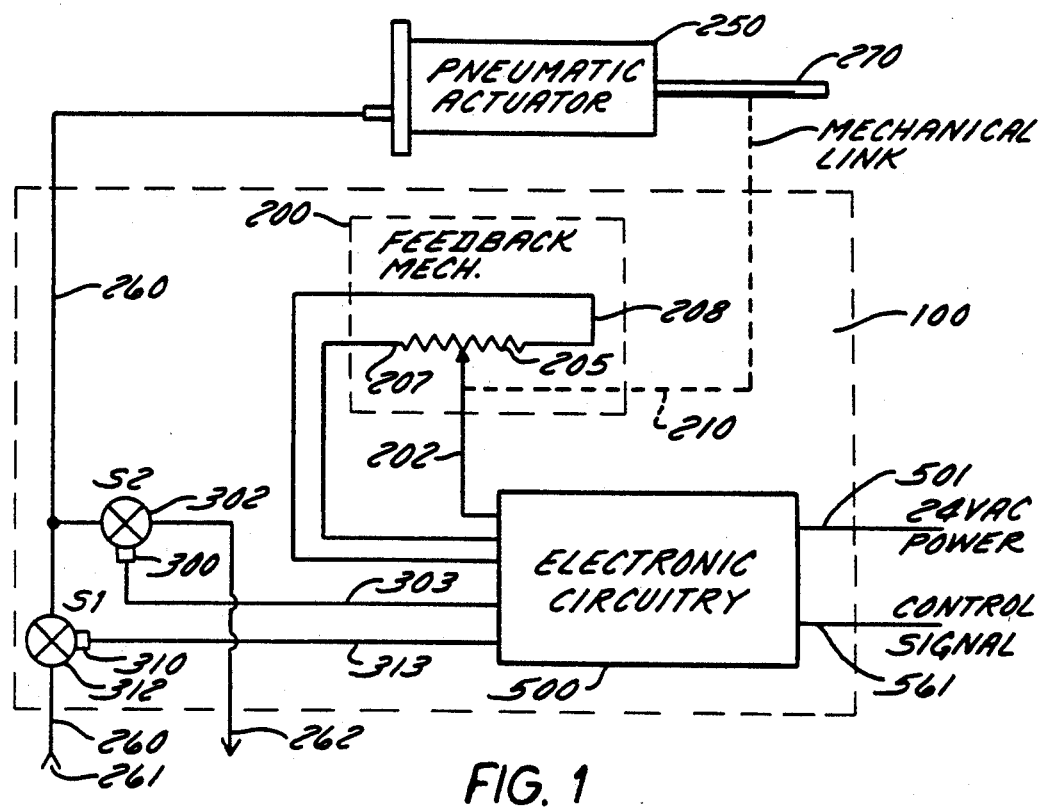
FIG. 1 is a general block diagram of the components of an embodiment of the present invention.

With the reference to FIG. 1, an exemplary embodiment of an electric/pneumatic positioner in the form of an electronic pilot positioner 100 shown is coupled to a pneumatic system via a pneumatic line 260 having an exhaust output 262 and a pneumatic supply input 261. Electronic pilot positioner 100 includes a control circuit 500, a solenoid 300, a solenoid 310, and a feedback mechanism 200. Electronic pilot positioner 100 is mechanically connected to a pneumatic actuator 250 via a mechanical link 210 and an output 270. Actuator 250 may be any linear pneumatic operator. Valves 302 and 312 under control of solenoids 300 and 310, respectively, enable positioner 100 to communicate with line 260 and control the amount of fluid in line 260.

With reference to FIG. 1, the operations of pilot positioner 100 in an environmental control system are described generally as follows. Control circuit 500 receives a control signal from a system controller or central controller (not shown) at an input 561. This control signal is indicative of the position to which output 270 of actuator 250 should be moved. This position is calculated by the central controller in response to various factors including temperature, humidity, or other environment control criteria.

Output 270 of actuator 250 may be moved from a stroke position (fully extended) to a home position (fully retracted). The control signal is indicative of a position within this linear range. If output 270 is installed on a damper, actuator 250 generally has a 3 to 6 inch full stroke distance, the linear distance between home and stroke. If actuator 250 is installed for use with a valve, output 270 generally has a full stroke linear distance of ½ to 1½ inches. Thus, the control signal indicates a position between home and full stroke.

In this particular embodiment, the actual position of output 270 is represented by a signal from a potentiometer 205 in feedback mechanism 200. Potentiometer 205 may be replaced by any mechanical to electric transducer which is capable of providing an electrical indication of a position such as a light sensor, switches, or other sensors. Preferably, feedback mechanism 200 is a JCI #N9510-601 feedback device which is employed in various JCI environmental control devices. Preferably, potentiometer 205 is a long life type of potentiometer having a resistance of 10k ohms. A wiper 202 of potentiometer 205 is coupled to mechanical link 210 which is coupled to output 270 of actuator 250. When output 270 is moved, wiper 202 is moved to indicate the position of output 270. Output 270 and mechanical link 210 may be comprised of levers, springs, pulleys, strings, wires or any other means of mechanical communication.

In a preferred embodiment, mechanical link 210 is a plastic coated air-craft cable connected to a wheel and actuator output 270 is a bar. When the bar is linearly moved, the bar pulls the cable which turns the wheel. The wheel is connected to wiper 202 so that wiper 202 moves when the wheel is turned. Alternatively, the cable may be tied directly to the damper or valve. The voltage at the wiper 202 in potentiometer 205 indicates the actual position of actuator output 270 and hence, the position of pneumatic actuator 250.

Control circuitry 500 compares the position control signal from the central controller to the actual position as represented by feedback mechanism 200. If the position of pneumatic actuator 250 is not the same as the position as indicated by the control signal, the position of actuator 250 is adjusted by pilot positioner 100. Specifically, control circuit 500 transmits control signals to solenoids 300 and 310 across conductors 303 and 313, respectively.

Pilot positioner 100 adjusts the position of actuator 250 by adjusting the amount of fluid such as air entering line 260 through valve 312 and input 261 and leaving line 260 through valve 302 and output 262. Thus, control circuit 500 adjusts the position of actuator 250 so that the actual position is approximately the same as the position indicated by the control signal from the system controller.

Figure 2:
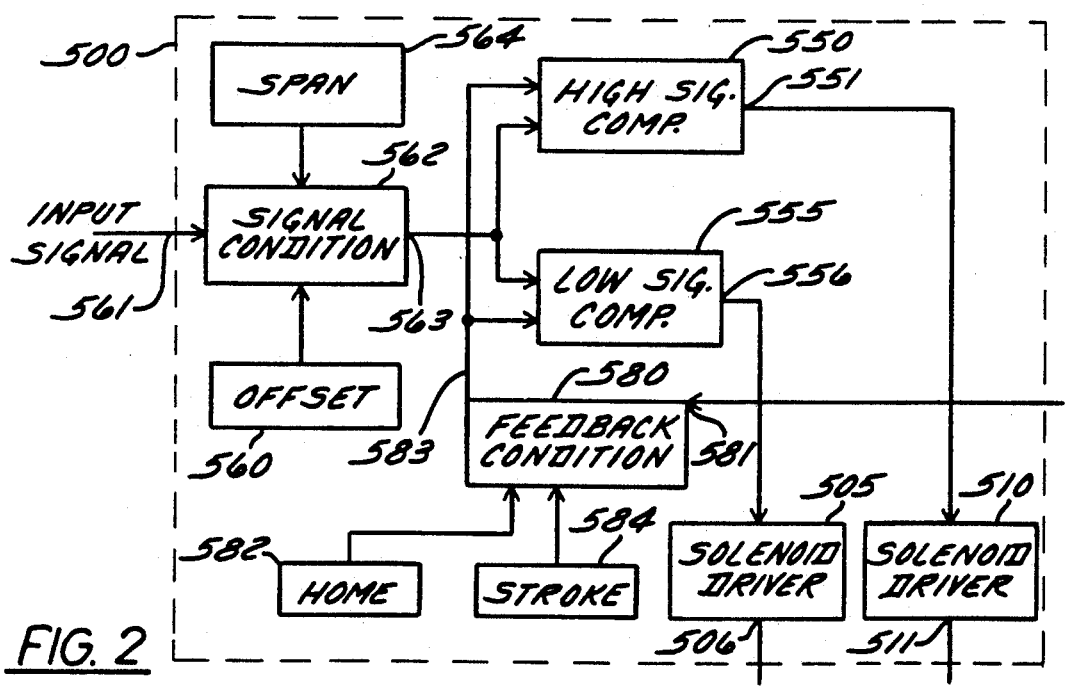
FIG. 2 is a block diagram of a control circuit in accordance with an embodiment of the present invention.

In accordance with a preferred embodiment of the present invention, control circuit 500 is described in more detail with reference to FIG. 2. Control circuit 500 comprises input 561 coupled to a first input of a signal condition circuit 562. An output of a span circuit 564 and an output of an offset circuit 560 are also coupled to a second input and a third input of signal condition circuit 562, respectively. An output 563 of signal condition circuit 562 is coupled to a first input of a high signal comparator 550 and a first input of a low signal comparator 555.

A second input of comparator 550 and a second input of comparator 555 are coupled to an output 583 of a feedback condition circuit 580. A first input 581 of feedback condition circuit 580 is coupled to position feedback mechanism 200. A home circuit 582 and a stroke circuit 584 are also coupled to a second and a third input of feedback condition circuit 580, respectively.

An output 551 of high signal comparator 550 is coupled to an input of a solenoid driver circuit 510, and an output 556 of low signal comparator 555 is coupled to an input of a solenoid driver circuit 505. An output 506 of solenoid driver circuit 505 is coupled to solenoid 300. An output 511 of solenoid driver circuit 510 is coupled to solenoid 310.

The operations of control circuit 500 are explained in detail as follows with reference to FIG. 2. Control circuit 500 receives a control signal from the central controller at input 561. The control signal is generally a 0 to 10 VDC signal with 0 V indicating home position and 10 V indicating stroke position. However, a 24

VDC range is also acceptable since the control signal is conditioned for appropriate reception by comparator circuits 550 and 555.

The control signal from input 561 is also conditioned by signal condition circuit 562 according to an offset adjustment from offset circuit 560 and a span adjustment from span circuit 564. The offset circuit 560 determines the point at which the control signal represents the home position. If the offset adjustment is set to 2 V, the actuator will not move until the control signal is greater than 2 V. In other words, if the control signal ranges from 0 to 10 volts and the offset adjustment is set to 2 V, a control signal of 0 to 2 V indicates that actuator 250 should be in the home position.

Similarly, span circuit 564 determines the point at which the control signal represents the stroke position. In other words, if the span adjustment is set to 8 V, the control signal of 8 to 10 V indicates that the actuator should be in the stroke position.

The span and offset adjustments allow the control signal to be conditioned so that only a band of voltage is needed to move actuator 250 from home to stroke. The ability to use bands allows the controller to use one control signal to control several actuators 250 and positioners 100. For instance, a system can be designed so that a first damper is opened as the control signal rises from 1 to 3 V, a second damper from 4 to 6 V, and a third from 7 to 9 V. This feature allows actuators 250 to be moved in a particular order as the voltage of one control signal changes from 0 to 10 V. Span circuit 564 and offset circuit 560 make this type of system possible.

After signal condition circuit 562 adjusts the control signal, the conditioned control signal is provided by signal condition circuit 562 at output 563. Output 563 provides this signal to high signal comparator 550 and low signal comparator 555.

Control circuit 500 receives an actual position signal from feedback mechanism 200 at input 581. The position signal is generally a voltage range similar to the voltage range of the conditioned control signal at output 563. In a preferred embodiment, the actual position signal may range from 9.5 to 12 V.

The actual position signal at input 581 is conditioned by feedback condition circuit 580 for appropriate reception by circuits 550 and 555. Circuit 580 also conditions the actual position signal in accordance with desired home adjustments from home circuit 582 and stroke adjustments from stroke circuit 584.

Home circuit 582 adjusts the actual position signal so that the actual position signal indicates actuator 250 is in the home position even when actuator 250 is not. In other words, the home adjustments set the actual position signal at the home voltage approximately equivalent to 0 V for the control signal when actuator 250 is in fact at a position higher than home. This operation is useful where the damper should be left open slightly or the actual home position should be otherwise adjusted.

Similarly, stroke circuit 584 adjusts the actual position signal so that the actual position signal indicates that actuator 250 is at the stroke position even when actuator 250 is at a lower position. In other words, the stroke adjustments change the range of the actual position signal so that the actual position signal reaches the stroke level before actuator 250 reaches the stroke position. This operation is performed in applications where actuator 250 is required to move less than full stroke. The home circuit 582 and stroke 584 also allow positioner 100 to be adjusted for different actuators 250. For instance, positioner 100 may be compensated for a longer or shorter stroke distance associated with a particular actuator 250 by means of home circuit 582 and stroke circuit 584. Thus, feedback condition circuit 580 provides a conditioned position signal adjusted in accordance with home and stroke criteria at output 583 to high signal comparator 550 and low signal comparator 555.

High signal comparator 550 outputs a high enable signal at output 551 when conditioned control signal at output 563 is greater than conditioned position signal at output 583. Low signal comparator 555 outputs a low enable signal at output 556 when conditioned control signal at output 563 is less than the conditioned position signal at output 583. The high enable signal and low enable signal are used to enable the driving of solenoids 310 and 300, respectively.

In response to a high enable signal from output 551, solenoid driver circuit 510 energizes solenoid 310 so that valve 312 is adjusted to cause actuator 250 to be extended. In other words, solenoid driver 510 extends actuator 250 by providing a control signal at output 511.

In response to a low enable signal from output 556, solenoid driver circuit 505 drives solenoid 300 so that valve 302 is adjusted to cause actuator 250 to be retracted. More particularly, solenoid driver 505 provides a signal at output 506 to solenoid 300. Solenoid 300 moves valve 302 in response to the signal at output 506 so that actuator 250 is retracted.

As pneumatic fluid, such as air, is added or removed from actuator 250, position feedback mechanism 200 senses the actual position of actuator output 270 and provides actual position signals at input 581. High signal comparator 550 and low signal comparator 555 provide appropriate high enable signals and low enable signals in response to the conditioned actual position signal at output 583 indicative of the signal at input 581. Hence, comparators 550 and 555 continue to respond with appropriate control signals as the actual position signal changes. Comparators 550 and 555 respond appropriately as the conditioned position signal and conditioned control signal become approximately equal to each other.

Figure 3A:
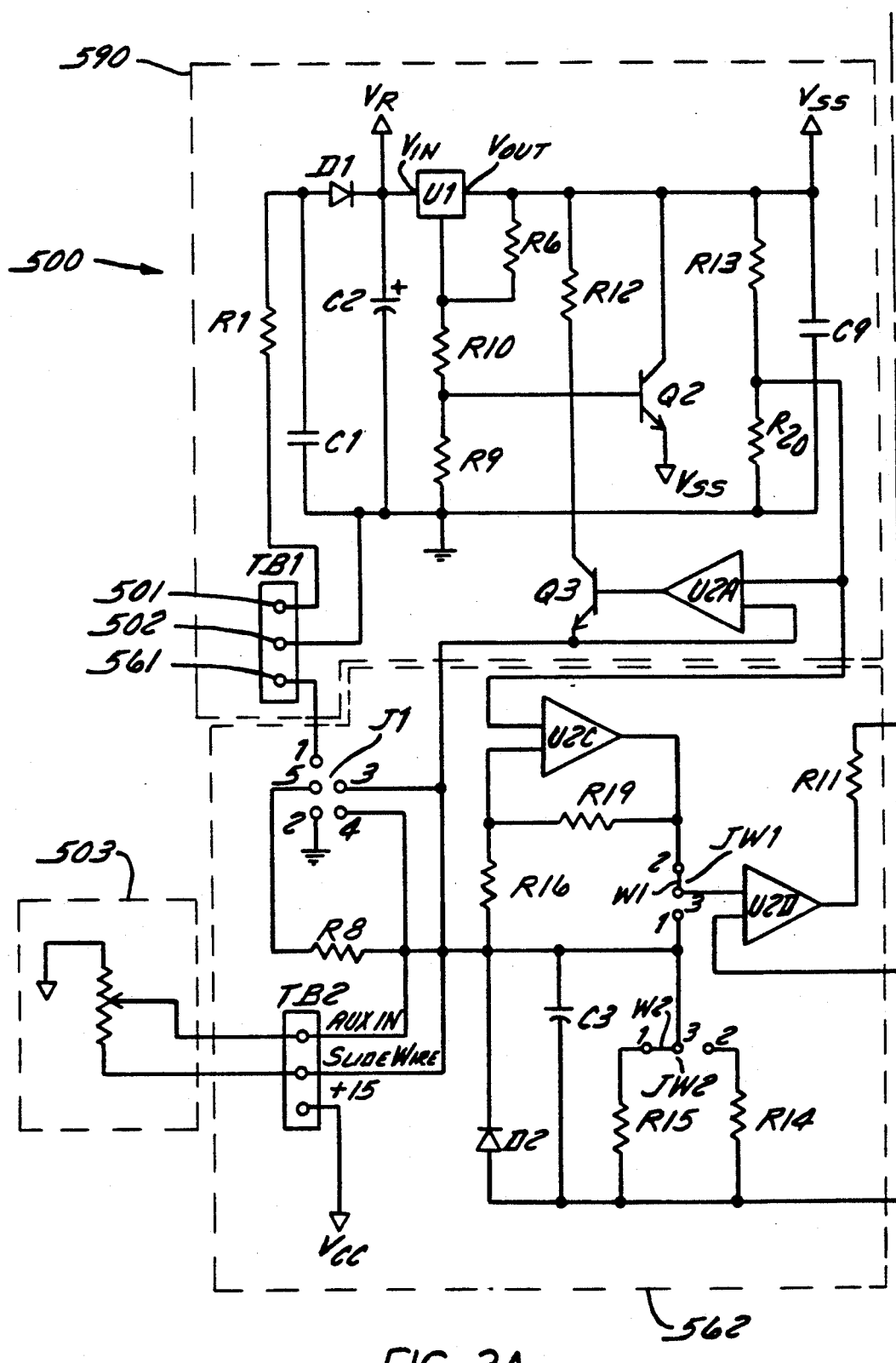
FIGS. 3A and 3B are a detailed schematics of the control circuit employed in a preferred embodiment of the present invention.
Figure 3B:
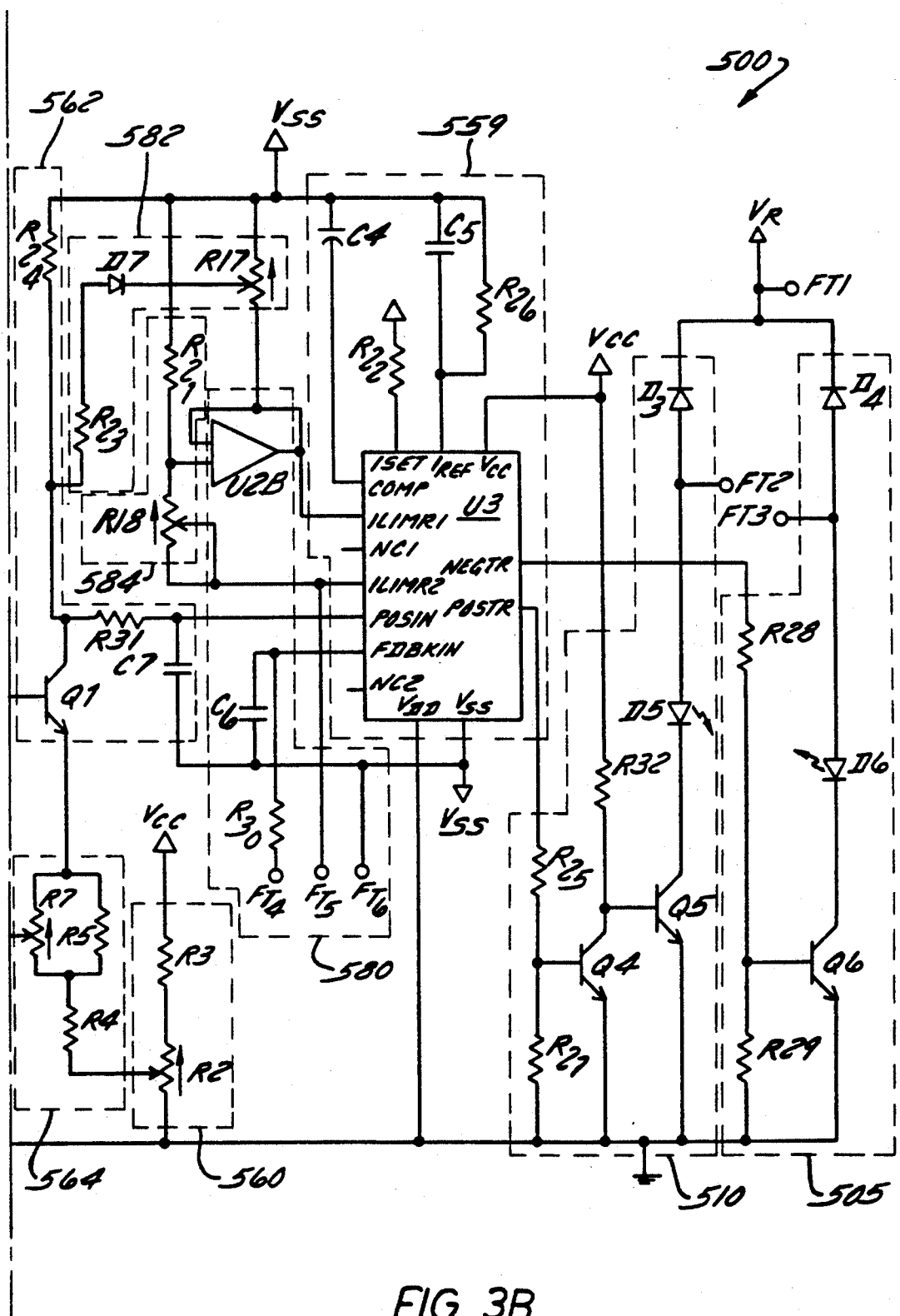

With reference to FIGS. 3A and 3B, a more detailed description of a control circuit 500 in accordance with the present invention is described as follows. Preferred values and part numbers of the various circuit components are contained in Table 1. Control circuit 500 comprises a power circuit 590, signal condition circuit 562, offset circuit 560, span circuit 564, a comparator circuit 559 similar to a combination of high signal comparator 550 and low signal comparator 555, feedback condition circuit 580, home circuit 582, stroke circuit 584, solenoid driver 505, and solenoid driver 510.

Power circuit 590 provides DC power to various circuit elements in control circuit 500. Power circuit 590 includes a resistor R1 with a first end coupled to AC voltage input 501. AC input 501 is provided on the AC terminal of a connector TB1. A second end of resistor R is coupled to an anode of a diode D1 and a first end of capacitor C1. A second end of capacitor C1 is coupled to an AC ground input 502 on connector TB1 or signal ground. The cathode of diode D1 is coupled to the positive terminal of capacitor C2, the $V_{IN}$ pin of a voltage regulator U1, and a voltage signal VR.

A first end of a resistor R10 is coupled to the adjust pin of regulator U3 and a first end of a resistor R6. A second end of resistor R10 is coupled to a first end of a resistor R9 and the base of a transistor Q2. A second end of resistor R9 is coupled to ground.

A second end of resistor R6 is coupled to the $V_{OUT}$ pin of regulator U1. The $V_{OUT}$ pin of regulator U1 is also coupled to a first end of a resistor R12, the collector of transistor Q2, a first end of a resistor R13, the positive terminal of a capacitor C9, and a voltage signal VCC. The negative terminal of capacitor C9 is coupled to ground. The emitter of transistor Q2 is coupled to power signal VSS.

The second end of resistor R13 is coupled to a first end of a resistor R20 and a +1 volt power signal, +1 V. A second end of resistor R20 is coupled to ground.

The positive terminal of an amplifier U2A is coupled to signal +1 V. Amplifier U2C is one of four amplifiers in an IC package; the four amplifiers are amplifiers U2A, U2B, U2C and U2D. The negative terminal of amplifier U2A is coupled to the emitter of a transistor Q3. The output of amplifier U2A is coupled to the base of transistor Q3. The collector of transistor Q3 is coupled to a second end of resistor R12.

Signal condition circuit 562 receives a control signal from the central controller and generates a conditioned central control signal. The control signal from the central controller is referred to as the controller signal. Circuit 562 includes a jumper circuit J1 with a first terminal coupled to input 561 on connector TB1. A second terminal on jumper circuit J1 is coupled to ground, a third terminal is coupled to a slide wire input on a connector TB2. A fourth terminal of jumper J1 is coupled to auxiliary input AUXIN on connector TB2. A fifth terminal on jumper circuit J1 is coupled to a first end of resistor R8. A second end of resistor R8 is coupled to terminal 4 of jumper circuit J1 and a first end of a resistor R16. Connectors TB1 and TB2 are generally terminal blocks which are known in the art.

The first end of resistor R16 is also coupled to the positive terminal of a capacitor C3 and a third terminal of a jumper W1. The anode of diode D2 and the negative terminal of capacitor C3 are coupled to ground.

A second end of resistor R16 is coupled to a first end of a resistor R19 and the negative terminal of an operational amplifier U2C. A second end of resistor R19 is coupled to a second terminal of jumper W1 and the output of amplifier U2C. The positive input of amplifier U2C is coupled to voltage signal of one volt. A first terminal of jumper W1 is also coupled to a third terminal of a jumper W2.

A third terminal of jumper W1 is coupled to the positive input of an amplifier U2D. The output of amplifier U2D is coupled to a first end of a resistor R11. A second end of resistor R11 is coupled to the base of a transistor Q1. The collector of transistor Q1 is coupled to a first end of a resistor R31 and a first end of a resistor R24. A second end of resistor R24 is coupled to voltage signal VSS. A second end of resistor R31 is coupled to a first end of capacitor C7. A second end of capacitor C7 is coupled to voltage signal VSS.

Span circuit 564 provides signals to circuit 562 to adjust the value of the conditioned central control signal in accordance with span criteria. Span circuit 564 includes a potentiometer R7. The wiper terminal of potentiometer R7 is coupled to the negative input of amplifier U2D in signal condition circuit 562. A first end of potentiometer R7 is coupled to the emitter of transistor Q1 in signal condition circuit 562 and to a first end of resistor R5 in circuit 564. A second end of potentiometer R7 is coupled to a second end of resistor R5 and a first end of resistor R4.

Offset circuit 560 provides signals to circuit 562 to adjust the value of the conditioned signal in accordance with offset criteria. Offset circuit 560 includes a potentiometer R2. The wiper of potentiometer R2 is coupled to a second end of resistor R4 in span circuit 564. A first end of potentiometer R2 is coupled to a first end of a resistor R3. A second end of potentiometer R2 is coupled to ground. A second end of resistor R3 is coupled to voltage signal VCC.

Feedback condition circuit 580 provides a conditioned feedback signal indicative of the actual position of actuator 250. Circuit 580 includes a terminal FT4, a terminal FT5, and a terminal FT6. Terminal FT4 is coupled to position feedback mechanism 200. Specifically, terminal FT4 is coupled to wiper 202 of potentiometer 205. Terminal FT5 is coupled to terminal 206 and voltage signal VSS; terminal FT6 is coupled to terminal 207 of potentiometer 205. A first end of a resistor R30 is coupled to terminal FT4. A second end of resistor R30 is coupled to a second terminal of a capacitor C6. Feedback condition circuit 580 also includes an amplifier U2B. The output of amplifier U2B is coupled to the negative input of amplifier U2B and to circuit 559.

Home circuit 582 provides signals to circuit 580 to adjust the value of the conditioned feedback signal in accordance with home criteria. Home circuit 582 includes a potentiometer R17. The wiper of potentiometer R17 is coupled to the cathode of a diode D7. A first end of potentiometer R7 is coupled to voltage signal VSS. The anode of diode D7 is coupled to a first end of resistor R23. A second end of resistor R23 is coupled to the collector of transistor Q1 of circuit 562.

Stroke circuit 584 provides signals to circuit 580 to adjust the value of the conditioned feedback signals in accordance with stroke criteria. Stroke circuit 584 includes a potentiometer R18. The wiper of potentiometer R18 is coupled to a first end of potentiometer R18. A second end of potentiometer R18 is coupled to a first end of a resistor R21. A second end of resistor R21 is coupled to voltage signal VSS.

Comparator circuit 559 compares the values of the feedback signal and conditioned control signal and produces control signals in accordance with the comparison. Circuit 559 includes control signal circuit U3. Circuit 559 utilizes circuit U3 which is preferably an integrated circuit designed by Johnson Controls, Inc. The integrated circuit or "monochip" is used in various devices produced by Johnson Controls, Inc. including the M100, EDA8000, VA8052, and VA8022. The interaction of circuit U3 with other components of circuit 500 performs various operations similar to the operations of circuits 550 and 555.

A COMP input of circuit U3 is coupled to the negative terminal of a capacitor C4. The positive terminal of capacitor C4 is coupled to voltage signal VSS. Terminal VDD of circuit U3 is coupled to ground. An input VSS is coupled to voltage signal VSS. An input VCC of circuit U3 is coupled to voltage signal VCC. POSIN input of circuit U3 is coupled to the second end of a resistor R31 in signal condition circuit 562. An input ISET is coupled to a first end of a resistor R22. A second end of resistor R22 is coupled to voltage signal VCC.

Terminal FT5 is also coupled to an output ILIMR2 of circuit U3. An input FDBKIN of circuit U3 is coupled to a second end of resistor R30. An terminal IREF is coupled to a first end of a resistor R26 and a first terminal of a capacitor C5. A second end of capacitor C5 and a second end of resistor R26 is coupled to voltage signal VSS. The output of amplifier U2B in circuit 580 is coupled to output ILIMR1 of circuit U3. An output NEGTR is coupled to output 551, and an output POSTR is coupled to output 556.

Solenoid driver circuit 510 provides signals to solenoid 310 in response to signals of output 551. Solenoid driver circuit 510 includes a transistor Q6. The collector of transistor Q6 is coupled to the cathode of a diode D6. The anode of LED D6 is coupled to an terminal FT3 which is coupled to a first input of solenoid 310. The anode of diode D6 is also coupled to the anode of a diode D4. The cathode of diode D4 is coupled to voltage signal VR and an terminal FT1. Output F1 is coupled to a second input of solenoid 310. The base of transistor Q6 is coupled to a first end of a resistor R28. A second end of resistor R28 is coupled to output 551 of circuit 559. The base of transistor Q6 is also coupled to a first end of a resistor R29, and a second end of resistor R29 is coupled to ground. The emitter of transistor Q5 is coupled to ground.

Solenoid driver circuit 505 provides signals to solenoid 300 in response to signals at output 556. Circuit 505 includes a transistor Q5. The emitter of transistor Q5 is coupled to ground. The collector of transistor Q5 is coupled to the cathode of an LED D5. The anode of diode D5 is coupled to the anode of a diode D3 and to an terminal FT2 which is coupled to a first input of solenoid 300. The cathode of diode D3 is coupled to voltage signal VR and terminal FT1 which is coupled to a second input of solenoid 300.

The base of transistor Q5 is coupled to a first end of resistor R32. The second end of resistor R32 is coupled to voltage signal VCC. The base of transistor Q5 is also coupled to the collector of a transistor Q4. The base of transistor Q4 is coupled to a first end of a resistor R27 and a first end of a resistor R25. A second end of resistor R27 is coupled to ground. The emitter of transistor Q4 is also coupled to ground. A second end of resistor R25 is coupled to output 556 of circuit 559.

The operations of the various circuits in control circuit 500 are explained as follows. Power circuit 590 provides power to the various circuits in control circuit 500. Power circuit 590 receives an unregulated 24 VAC signal and provides an approximately 24 VDC signal, VR, an approximately 15 VDC signal, VCC, an approximately 12 volt VDC signal, VSS, and a 1 VDC signal, +1 V. Power circuit 590 receives the 24 VAC signal from input 501 at the AC terminal of connector TB1. This power signal is provided across resistor R1 and half wave rectified by diode D1. The half wave rectified signal is filtered by a large electrolytic capacitor C2. This signal is provided as signal VR to driver circuits 505 and 510.

Signal VR is also provided to regulator U1 which provides a regulated 15 volt signal, VCC, at output $V_{OUT}$. Voltage regulator U1 is programmed to provide approximately 15 volts at output $V_{OUT}$. Resistor R6, resistor R10, and resistor R9 set output $V_{OUT}$ to 15 volts. The components coupled to regulator U1 are described in product literature associated with regulator U1. Capacitor C1 is an input bypass capacitor employed to reduce the sensitivity to input line transients. Capacitor C9 also provides filtering for voltage signal VCC.

Voltage signal VCC is provided from regulator U1 to the collector of transistor Q2. The emitter of transistor Q2 provides an approximately 12 VDC signal, VSS. Resistors R6, R10 and R9 are connected in between VCC and ground and provide a voltage divider network. The junction of resistor R10 and resistor R9 provides an approximately 12.7 VDC signal to the base of transistor Q2. The emitter of transistor Q2 provides an approximately 12 VDC signal, VSS.

Resistors R13 and R20 also provide a voltage divider network between voltage signal VCC and ground. The junction between resistor R13 and R20 provides a 1 VDC signal, +1 V. This signal is provided to amplifier U2A and transistor Q3. Transistor Q3 is configured as an emitter follower to provide a 1 volt signal for a slide wire control apparatus. Amplifier U2A and transistor Q3 generally perform the operation of a unity gain amplifier. Amplifier U2A is powered by voltage signal VCC and is part of an LM2902 amplifier.

Signal condition circuit 562 receives power signal VCC from power circuit 590. A central controller signal from a central controller (not shown) is provided at input 561 at input IN of connector TB1. Generally, the signal at input IN is a 0–10 VDC signal, although a 0 to 24 VDC signal could be used. This controller signal represents the requested position to which pilot positioner 100 should move actuator 250. The controller signal is provided to the first terminal of jumper J1.

Jumper J1 has five terminals for providing various sources of inputs to signal condition circuit 562 which are used for field test and set-up. In the operating mode, term 1 and 5 are coupled together.

Alternatively, a controller signal can be provided by a slide wire control device 503 via input SLIDE WIRE on connector TB2. Slide wire control device 503 such as a T80 slide wire control device by Johnson Controls, Inc. allows a potentiometer to set the input signal. In this embodiment, the wiper of the potentiometer in device 503 is coupled to input AUXIN and a first terminal is coupled to input SLIDE WIRE. The second terminal of the potentiometer is coupled to COM or input 502. Jumper wire JW2 should short positions 1 to 3 on jumper W2 when a voltage signal is on input AUXIN.

Jumper W2 is used to select between voltage or current inputs for the AUXIN signal. If a 4 to 20 mA controller signal is input into the AUXIN input terminal of connector TB2, the current is driven across resistor R14. This is accomplished by moving jumper wire JW2 so that it connects terminal 3 and terminal 2 of jumper W2. Current signals input to the AUXIN terminal are intended to be 0-20 milliamp current inputs. This current signal input generates a 0-2 volt signal across resistor R14. This signal can be inverted through amplifier U2C as described below, or fed directly into amplifier U2D.

Preferably, controller signal on input IN is a DC signal 0–10 volts between input IN and input COM of connector TB1. This input is conducted with a jumper wire (not shown) from terminal 1 to terminal 5 of jumper J1. This signal travels across resistor R8 and through terminal 3 of jumper W2 across jumper wire JW2 to terminal 1 of jumper W2 and through resistor R15 to ground. Resistor R8 and R15 provide a voltage divider so that the signal is scaled down to 1/9 of its original value. Diode D2 protects an input of amplifier U2D if the controller signal were negative. In other words, the value of the controller signal at terminal 3 of jumper W2 is 1/9 as large as the value at input 561. Capacitor C3 provides a DC filter to filter out any AC noise associated with the controller signal. Thus, in this embodiment, the 0 to 10 controller signal at input 561 is a 0-1.1 volt signal at terminal 3 of jumper W2.

Circuit 562 is capable of inverting the signal at terminal 3 of jumper W2. This capability allows positioner 100 to accommodate inverted signals without changing mechanical connections. Generally, the controller signal can come in one of two forms wherein a higher voltage of the controller signal indicates the more actuator 250 should be retracted, or a higher voltage of the controller signal indicates the more the actuator should be extended. All signals at terminal 3 of jumper W1 extend actuator 250 in response to greater voltage.

In this particular embodiment with jumper wire JW1 across terminals 2 and 3 of jumper W1, the higher the voltage of the controller signal, the more actuator 250 should be retracted. If jumper wire JW1 is connected between terminals 1 and 3 of jumper W1, the control signal is not inverted and directly provided to the positive terminal of amplifier U2D. In this embodiment, the higher the voltage of the controller signal, the more actuator 250 should be extended.

With reference to FIGS 3A and 3B, circuit 562 is configured to invert the controller signal. The signal is provided through resistor R16 to the negative input of amplifier U2C. Amplifier U2C inverts the controller signal about the +1 V signal provided to the positive input of amplifier U2C. In other words, a 0 to 1 V signal input to amplifier U2C is output as a 2 to 0 V signal and vice versa. Thus, amplifier U2C outputs an inverted controller signal to terminal 2 of jumper W2 which allows the use of direct and reverse control signals.

The controller signal travels across jumper wire JW1 to terminal 3 of jumper W1 and into the positive terminal of amplifier U2D. Amplifier U2D adjusts the signal according to signals from offset circuit 560 and span circuit 564. The signals from circuits 560 and 564 are provided to the negative input of amplifier U2D via the wiper of potentiometer R7. The output of amplifier U2D is provided through resistor R11 to the base of transistor Q1.

Circuit 562 provides a current signal to circuit 559 at input POSIN. This current signal through resistor R24 provides a voltage signal at resistor R31 at the collector of transistor Q1. The signal at the collector of transistor Q1 is generally a 12 to 9½ VDC signal with the higher the voltage indicating more retraction of actuator 250. This signal is adjusted by various components in circuits 562, 564, and 560.

Resistor R11 prevents the signal at the collector of transistor Q1 from rising when it is saturated. When the signal at the positive terminal increases in voltage, amplifier U2D drives its output towards 15 volts while the collector of transistor Q1 is being pulled down toward 9½ volts for a full stroke condition. Resistor R11 prevents the actuator from reversing direction by preventing saturation of transistor Q1. If transistor Q1 saturates and the voltage at the emitter of transistor Q1 were allowed to increase as the voltage at the emitter increased, the voltage at the collector of transistor Q1 would increase and, hence, a higher controller signal is perceived by circuit 559.

As an example, if the signal at the collector of transistor Q1 represents full stroke, an approximately 2.5 V increase in the signal causes actuator 250 to fully retract. When potentiometer R7 is set to 100K for maximum span, if the positive terminal of amplifier U2D approaches 3 volts, the voltage of the wiper of potentiometer R7 and the emitter of transistor Q1 approach 3 volts. As the positive input of amplifier U2D increases further, the output of amplifier U2D approaches 15 volts. Resistor R11 prevents the saturation of transistor Q1 from causing the voltage at the collector of Q1 to increase above 9.5 V. If the voltage at the collector of transistor Q1 increases, actuator 250 would retract.

Transistor Q1 also is involved in the adjustment of the signal in accordance with signals from offset circuit 560 and span circuit 564. The signals from circuits 560 and 564 are provided to the emitter of transistor Q1. These signals are indicative of the settings of potentiometers R7 and R2 affect the biasing of transistor Q1, and hence the signal at the collector.

As discussed above, offset circuit 560 provides a signal to signal condition circuit 562. Offset circuit 560 allows adjustment of the level at which the controller signal indicates that the actuator 250 should be moved from the home position. Offset circuit 560 allows potentiometer R2 to set the minimum voltage at the emitter of transistor Q1 from approximately 0 to 2.5 volts. A voltage divider comprised of resistor R3 and potentiometer R2 provide this ability. By setting potentiometer R2, the offset voltage can be set so that the voltage at the emitter of transistor Q1 varies from approximately 0 to at least 2.5 V. This feature allows the offset voltage to be set from 0 to 22.5 V as seen by the central controller. Thus, if the central controller output a signal which is less than or equal to 21 VDC, the offset voltage can be set over any point of the controller signal spectrum.

As mentioned previously, span circuit 564 also adjusts the output of amplifier U2D. The wiper output of potentiometer R7 is coupled to the negative input of amplifier U2D. Potentiometer R7 also biases transistor Q1. Potentiometer R7 controls the gain of circuit 562 with the output of amplifier U2D. Potentiometer R7 adjusts the output by controlling negative feedback to the negative terminal of amplifier U2D. Adjusting the gain allows the span voltage level to be set so that the maximum level is reached when the controller signal is at a desired level.

Resistor R4 is used to define the minimum span when the wiper of potentiometer R7 is at the resistor R4 end. Resistor R5 is employed in parallel with potentiometer R7 to decrease the error due to the tolerance of potentiometer R7.

Feedback mechanism 200 is connected to terminals FT4, FT5, and FT6. Feedback condition circuit 580 provides a conditioned position signal indicative of the actual position of actuator 250. Potentiometer 205 in feedback mechanism 200 is connected between 12 volts, VSS, at terminal FT6, and an output ILIMR2 of circuit U3 at terminal FT5. The wiper of potentiometer R18 is also coupled to terminal FT5. Wiper 202 is connected to terminal FT4. Wiper 202 provides a signal from 12 volts (home or maximum retraction of actuator 250) and the set stroke voltage (stroke or maximum extension). Feedback mechanism 200 may be comprised of various circuits or sensors and is not limited to a potentiometer or other mechanical device.

The feedback condition circuit 580 conditions the actual position signal in accordance with criteria from circuits 582 and 584. Capacitor C6 provides filtering for the conditioned actual position signal. The set stroke voltage is provided by stroke circuit 584. The home voltage is provided by home circuit 582. The signal representative of the actual position of actuator 250 is provided to input FDBKIN of circuit U3. Resistor R30 and capacitor C7 provide AC filter of feedback signal.

Home circuit 582 and stroke circuit 584 provide adjustments to the actual position signal from position feedback circuit 200. Circuits 582 and 584 are similar to the adjustments made by offset circuit 560 and span circuit 564 for the controller signal. Stroke circuit 584 adjusts a stroke voltage through potentiometer R18. Terminal 206 of potentiometer 205 is connected to a first input of potentiometer R18 at terminal FT5.

The stroke voltage can be adjusted between 9.5 to 4.5 volts. By adjusting the stroke voltage with potentiometer R18, the actual position signal is changed. Potentiometer R18 affects this range through the interaction of output ILIMR1 and output ILIMR2 and amplifier U2B. As the impedance of potentiometer R18 is changed, the voltage at output ILIMR2 and terminal FT5 is changed. If the stroke voltage is set to 9.5 V, the actual position signal at terminal FT4 varies from 12 V to 9.5 V. If the stroke voltage is set at 4.5 V, the actual position signal at terminal FT4 varies from 12.0 V to 4.5 V. Thus, the full stroke voltage can be adjusted to be between approximately 40 and 100% of the total stroke of the feedback potentiometer 205.

Home circuit 582 adjusts home voltage with potentiometer R17 which is coupled to the output of amplifier U2B. Home circuit 582 allows the minimum actual position of actuator 250 to be adjusted from 0 to 33% of the actual full stroke position from position feedback circuit 250. Home circuit 582 prebiases resistor R24 to reflect a minimum home position via diode D7 and resistor R23. More particularly, diode D7 and resistor R23 operate to adjust the minimum voltage across resistor R24 to be between 0 and 1 VDC. Thus, circuit 582 affects the voltage at the collector of Q1 to provide a home adjustment for circuit 200.

The voltage across resistor R21 is regulated by circuit 559 to be approximately the same as the voltage across resistor R26 at terminal IREF. Since amplifier U2B is configured as a unity gain follower, the voltage at the output of amplifier U2B is equal to the voltage at terminal IREF. Circuit 559 accomplishes this regulation by adjusting the voltage at output ILIMR2 so that the proper voltage drop is across resistor R21. The voltage at the positive terminal of amplifier U2B is approximately equal to the voltage at output ILIMR1. In other words, circuit 559 adjusts the stroke voltage at output ILIMR2 in response to adjustments to potentiometer R18.

Terminal IREF draws the same amount of current as input ISET. Hence, terminal IREF draws 1 mA through resistor R26, creating an approximately 2.5 volt voltage drop from VSS to terminal IREF of circuit U3. Output ILIMR2 draws enough current so that the voltage sensed at output ILIMR1 is equal to the voltage at terminal IREF. Thus, the output of U2B provides approximately a 9.5 volt signal to output ILIMR1 of circuit U3.

Circuit 559 receives a signal representing the controller signal at input POSIN. Circuit 559 also receives a signal representing the actual position of actuator 250 at input FDBKIN. When the collector of transistor Q1 is higher than the terminal FT4 by at least 30 millivolts, output POSTR goes HIGH until input FDBKIN approximately equals input POSIN. Similarly, when the collector of Q1 is lower than terminal FT4 by at least 30 millivolts, output NEGTR goes HIGH until input FDBKIN approximately equals input POSIN.

Capacitors C6 and C7 provide filtering for the signals at inputs FDBKIN and POSIN. Specifically, capacitors C6 and C7 diminish external noise associated with feedback circuit 200 as well as other noise from the environment.

Circuit 559 is designed to provide hysterisis. Hysterisis prevents unnecessary cycling or turning ON and OFF of solenoids 300 and 310 by requiring that the input change by a certain amount before affecting outputs POSTR and NGTR. This technique of preventing unnecessary cycling by using hysterisis is well known in the art. Circuit 559 could be replaced by various other comparator circuit designs. Further, the circuitry of other portions of control circuit 500 could be replaced in order to accommodate different comparator circuit designs.

Figure 4:
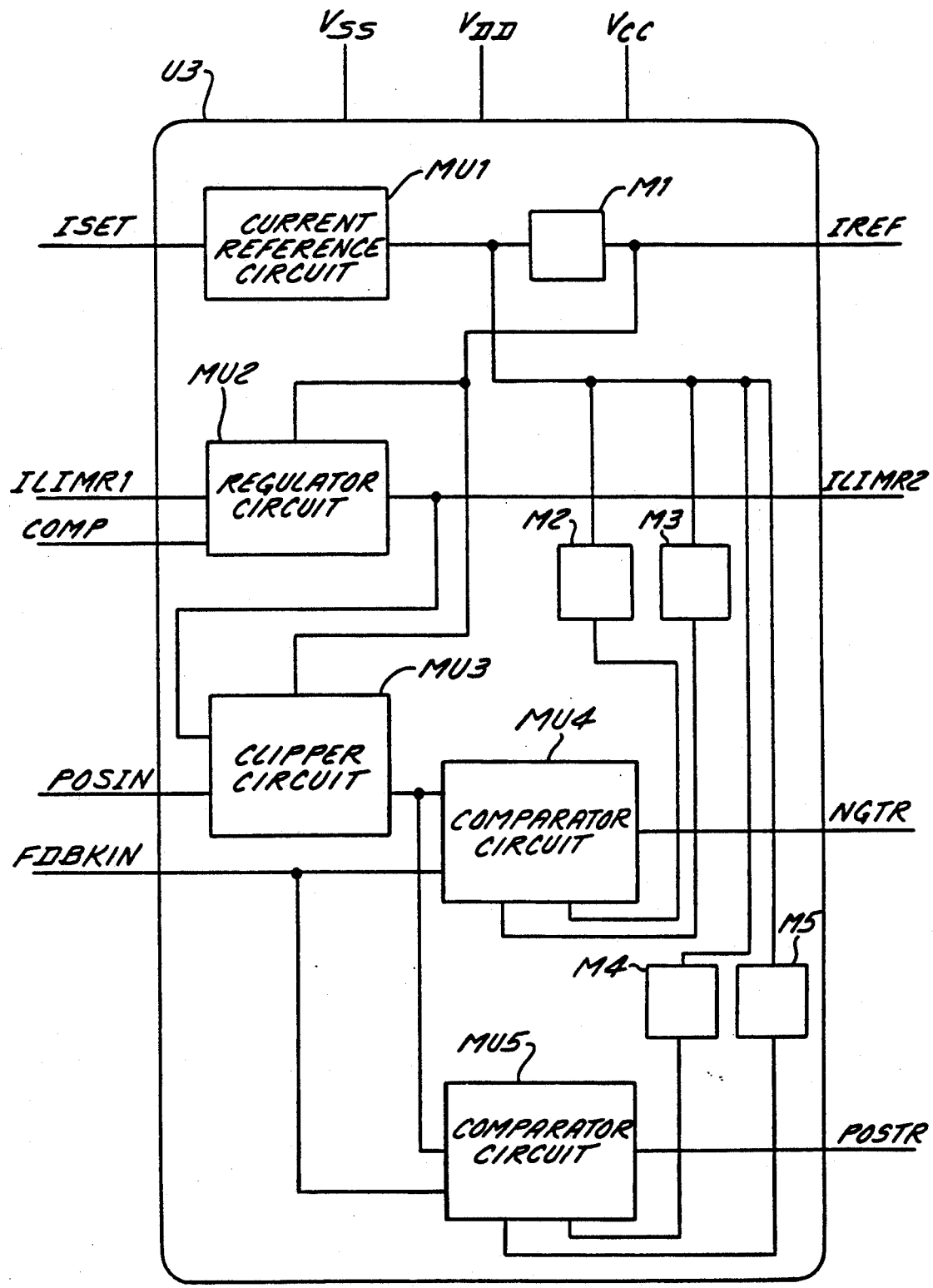
FIG. 4 is a block diagram of a portion of the control circuit.

As stated above, circuit U3 can be found in other JCI devices including the M100, VA8052, EDA8000 and VA8022. Circuit U3 interacts with various circuit elements to provide the operations of circuit 559. With reference to FIG. 4, circuit U3 includes a current reference circuit MU1, a regulator circuit MU2, a clipper circuit MU3, a comparator circuit MU4, a comparator circuit MU5, a current mirror M1, a current mirror M2, a current mirror M3, a current mirror M4, and a current mirror M5. The components of circuit U3 have access to the various voltage signals provided at inputs VSS, VDD (ground), and VCC. An input of current reference circuit MU1 is coupled to input ISET, and an output of circuit MU1 is coupled to an input of current mirrors M1, M2, M3, M4 and M5.

An output of current mirror M1 is coupled to a first input of regulator circuit MU2 and a first input of clipper circuit MU3. The output of mirror M1 is also coupled to terminal IREF.

Regulator circuit MU2 has a second input coupled to output ILIMR1, and a third input coupled to COMP input. An output of regulator circuit MU2 is coupled to a second input of clipper circuit MU3 and output ILIMR2.

An output of clipper circuit MU3 is coupled to a first input on comparator circuit MU4 and a first input on comparator circuit MU5. A second input of clipper circuit MU3 is coupled to input POSIN.

A second input of comparator circuit MU4 and a second input of comparator circuit MU5 are coupled to input FDBKIN. An output of comparator circuit MU4 is coupled to output NGTR, and an output of comparator circuit MU5 is coupled to output POSTR.

Inputs of current mirrors M1, M2, M3, M4, and M5 are coupled to the output of current reference circuit MU1. The output of current mirrors M2 and M3 are coupled to a third input and a fourth input on comparator circuit MU4. The outputs of current mirrors M4 and M5 are coupled to a third input and a fourth input on comparator circuit MU5.

As has been known in the art, there are various ways of implementing circuits to provide the operations of circuit U3. For instance, current mirror circuits M1, M2, M3, M4, and M5 may be implemented as transistors and employed as current mirrors. Further, voltage regulator circuit MU1 can be employed as transistors employed as an operational amplifier or a differential amplifier.

The operations of circuit U3 are explained as follows. A reference current is provided at input ISET to current reference circuit MU1. Circuit MU1 provides a reference current through current mirror M1 at terminal IREF. Current reference circuit MU1 provides a regulated voltage at input ISET so that the reference current is related to voltage VCC and resistor R22. The output of current reference circuit MU1 provides this reference current to current mirror M1, which provides the reference current to terminal IREF as well as regulator circuit MU2. This current is also supplied to current mirrors M2, M3, M4, and M5.

Regulator circuit MU2 sets the voltage at output ILIMR1 equal to the voltage at terminal IREF. The input COMP is used to filter and prevent oscillations in circuit U3. Circuit MU2 may be implemented as an operational amplifier.

Clipper circuit MU3 is used as a voltage clipper which prevents POSIN input from becoming more negative than the voltage at terminal IREF. The regulated voltage at output ILIMR2 is current limited by resistors R18 and R17 between outputs ILIMR1 and ILIMR2. Regulator circuit MU2 and clipper circuit MU3 may be implemented through transistors arranged as operational amplifiers, as is well known in the art.

Comparator circuits MU4 and MU5 compare the signal at input POSIN from clipper circuit MU3 to the signal at input FDBKIN. Comparators MU4 and MU5 provide driver circuits for providing an output at outputs NGTR and POSTR. Comparator circuits MU4 and MU5 may be transistors arranged in the form of comparators or operational amplifiers, as is well known in the art. Thus, when input POSIN is greater than FDBKIN by approximately 30 mV, comparator circuit MU4 will provide a logic high at output POSTR, and comparator circuit MU4 will provide a logic low at output NGTR. When the signal at input FDBKIN is 30 mV greater than the input POSIN, comparator circuit MU4 provides a logic high at output NEGTR and comparator circuit MU5 provides a logic low at output POSTR. When the signal at input FDBKIN is within 10 mV of the input at POSIN, comparator circuits MU4 and MU5 drive outputs NGTR and POSTR low.

With reference to FIGS. 3A and 3B, circuit 559 generates control signals for circuits 505 and 510. Resistor R22 sets a reference current at 1 mA to be received by circuit U3 at input ISET. Circuit U3 is designed so that 1 mA is drawn at input ISET when signal VCC equals 15 V and resistor R22 is a 13 K resistor. Capacitor C5 is employed to filter the signal at terminal IREF. Capacitor C5 also prevents high frequency oscillations of the transistors associated with circuit U3.

With reference to FIGS. 3A and 3B, solenoid driver circuit 510 receives a control signal from output NEGTR of circuit U3. When output NEGTR goes HIGH, current travels through resistors R28 and R20. Thus, when output NGTR goes HIGH, transistor Q6 is turned ON. When transistor Q6 is turned ON, current travels from power signal VR through terminal FT1 into solenoid 310, into terminal FT3, through diode D6, into transistor Q5 and to ground. Solenoids 300 and 310 are coupled to signal VR so that heavy power requirements are not drawn from regulator U1. Current traveling through solenoid 310 moves valve 312 so that actuator 250 extends. Solenoid 310 and valve 312 are configured so that the valve 312 is normally closed when solenoid 310 is de-energized. When output NEGTR goes low, transistor Q6 is turned OFF and solenoid 310 is de-energized. When solenoid 310 is de-energized, the actuator 250 cannot extend since supply air is cut-off.

Diode D4 provides a flyback or freewheeling diode to protect transistor Q6 as well as other components when solenoid 310 is turned ON and OFF.

Solenoid driver circuit 505 receives a signal from output POSTR of circuit U3. When output POSTR goes HIGH, current travels through resistor R25 and resistor R27. The voltage drop across resistor R27 turns transistor Q4 ON. When transistor Q4 is turned ON, current travels from voltage signal VCC, through resistor R32, through transistor Q4 and to ground. When transistor Q4 turns on, it shuts off transistor Q5 by shorting the base to emitter of Q5. When transistor Q5 is turned OFF, no current is conducted through transistor Q5. Thus, no current travels from voltage signal VR through terminal FT1 through solenoid 300. Thus, solenoid 300 is de-energized. Solenoid 300 and valve 302 are configured so that the valve is normally open when solenoid 300 is de-energized. Therefore, actuator 250 retracts when POSTR signal goes high. With this arrangement, actuator 250 is also retracted upon power failure.

If output POSTR goes LOW, transistor Q4 is turned OFF and transistor Q5 is turned ON so that current travels from voltage signal VR through terminal FT1, through solenoid 300, into terminal FT2 through diode D5 and transistor Q5 to ground. Diode D5 is a free wheeling diode. When current travels through solenoid 300, solenoid 300 is energized so that valve 302 is closed and actuator 250 does not retract.

Figure 5:
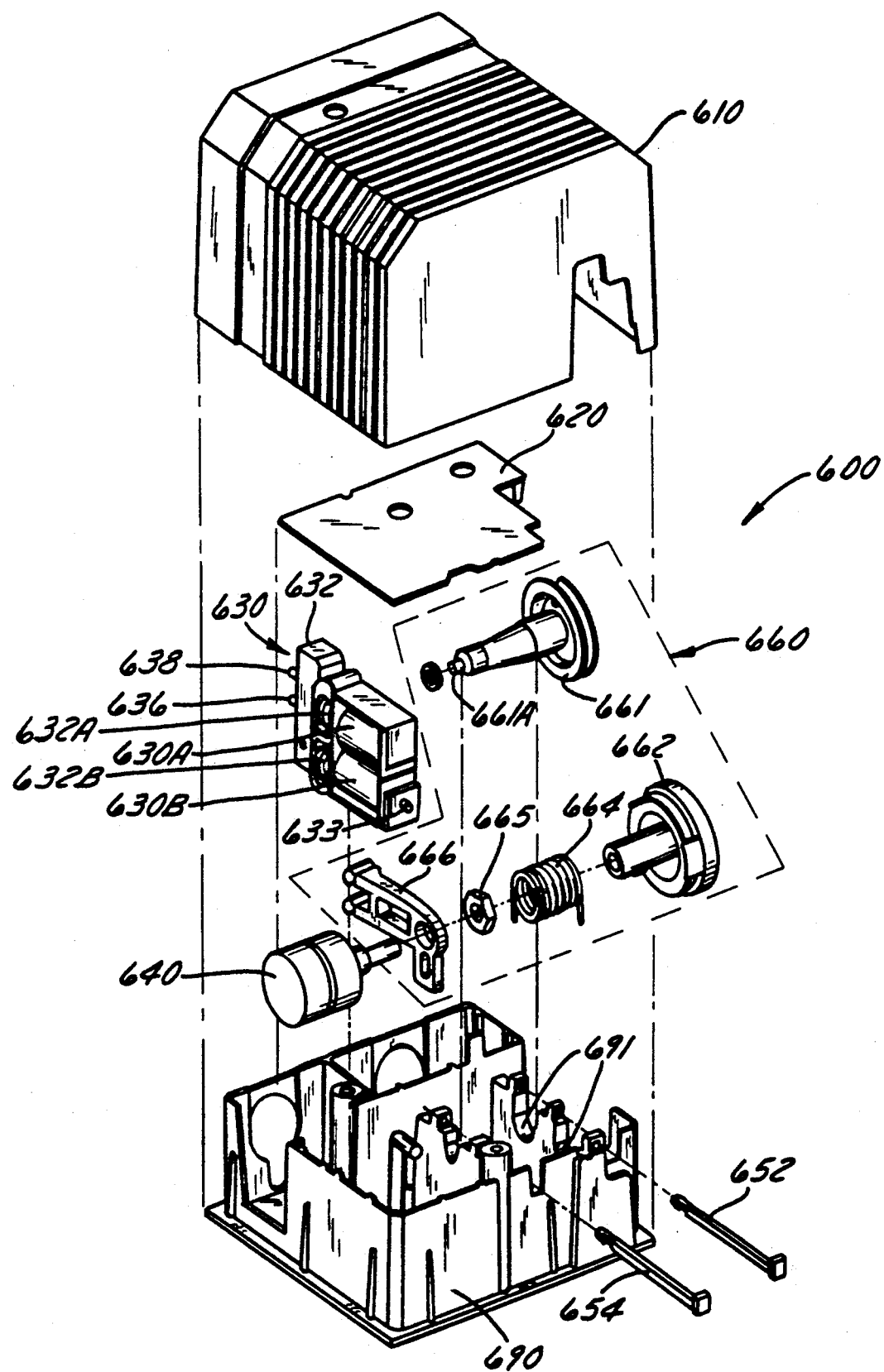
FIG. 5 is a schematic of a module employing features of a preferred embodiment of the present invention.

With reference to FIG. 5, an electronic pilot positioner 600 in accordance with an alternative exemplary embodiment of the present invention is employed as one modular unit. Pilot positioner 600 includes a cover 610, a fastener 654, a fastener 652, and a housing 690 for sheltering the various components of pilot positioner 600. Fasteners 654 and 652 lock the components to housing 610. Positioner 600 is for use in an HVAC system with actuators which provide linear motion for opening and closing dampers and valves.

Pilot positioner 600 is generally made from plastic LEXAN 950. Pilot positioner 600 is generally fastened to actuator 250 by means of a hose clamp around actuator 250, a bracket (not shown), and positioner 600. Various means of fastening positioner 600 may be employed. Pilot positioner 600 includes a circuit board 620 for providing the various electronic control signals associated with a control circuit like control circuit 500, a wheel mechanism 660, a potentiometer 640, a solenoid/valve unit 630.

Wheel mechanism 660 includes a wheel 661, a spring 664, a nut 665, a bracket 666, and a wheel 662. The axle of wheel 661 fits within spring 664. Wheel 662 has teeth which mesh with teeth on wheel 661. A nut 665 attaches potentiometer 640 to bracket 666. Wheel 661 is in mechanical communication with the wiper of potentiometer 640. A cable attached to output 280 at actuator 250 turns wheel 661 when output 280 is moved linearly. Wheel 661 is also turned in the opposite direction by spring 664 when minimal tension is on the string. Wheel mechanism 660 fits within a cradle 691 of housing 690.

Wheel mechanism 660 may be configured for various full stroke distances. The string is attached to wheel 661 for actuators with strokes of 6 inches. Wheel 661 turns wheel 662 providing a longer full stroke distance. The string is attached to wheel 662 for strokes of 1.5 inches as are used in valve applications.

Unit 630 is comprised of pneumatic input 638, a pneumatic output 636, a valve unit 632A, a valve unit a solenoid 630A and a solenoid 630B. Solenoids 630A and 630B are electrically connected to outputs on the control circuit on circuit board 620. Valve units 632A and 632B are part of solenoids 630A and 630B. Solenoids 630A and 630B are mechanically connected to valves inside valve units 632A and 632B.

Input 638 provides a connection for a pneumatic supply line into valve unit 632. Output 636 provides an output for pneumatic fluid leaving valve unit 632A to connect to the actuator. Valves inside unit 632 enable the air volume at output 638 to be increased or decreased. Valve units 632A and 632B are controlled by solenoids 630A and 630B. Valve unit 632B includes an exhaust port 630 for exhausting the fluid in actuator 250. Unit 630 fits within housing 690. Unit 630 is preferably an LD1 pneutronics P/N 990-1296-002.

Potentiometer 640 is in mechanical connection with wheel 661. As pulley wheel 661 is turned, a wiper inside potentiometer 640 is moved. Potentiometer 640 is preferably 10,000 ohms and one turn for full stroke. Electrical connections from potentiometer 640 provide electrical signals to the control circuit on circuit board 620.

It will be understood that while the various conductors/connectors may be depicted in the drawings as single lines, they are not shown in a limiting sense and may comprise plural conductors/connectors as understood in the art. Further, the above description is of preferred exemplary embodiments of the present invention; the invention is not limited to the specific forms shown. For example, while feedback mechanism 200 has been shown as a potentiometer, it is understood that various sensing devices could be substituted like optical sensors, Hall effect sensors, as well as other types of potentiometers. In addition, the various transducers like solenoids may be replaced by various other devices which may effect movement. Further still, the invention has been described with reference to block diagrams. These function blocks can be combined into the same device or separated into different discrete devices. For instance, the entire control circuit 500 could be implemented as one integrated chip. Also, the various signals described in the above embodiments may be replaced with serial signals, analog signals, or may be inverted or adjusted and still perform the operations of the control or position signals. These and other modifications may be made in the design and arrangement of the elements discussed herein without departing from the scope of the invention as expressed in the appended claims.

TABLE 1

| REFERENCE NUMERAL | PART NUMBER |
|---|---|
| U1 | IC, LM317T voltage regulator by Motorola or equivalent |
| U2 | IC, LM2902 Operational Amplifier by Motorola or equivalent |
| U3 | IC, MOD2607 by Johnson Controls or equivalent |
| Q1 | Transistor, 2N5822 |
| Q2 | Transistor, 2N5822 |
| Q3 | Transistor, 2N5822 |
| Q4 | Transistor, 2N5822 |
| Q5 | Transistor, 2N5822 |
| Q6 | Transistor, 2N5822 |
| TB1 | Terminal Block, 3 Pos. |
| TB2 | Terminal Block, 3 Pos. |
| R1 | 3 Ohms ± 5%, ¼ W |
| R2 | Potentiometer 500 Ohms |
| R3 | 2.49 K ¼ W |
| R4 | 237 Ohms 1% ¼ W |
| R5 | 11.3 K ± 1%, ¼ W |
| R6 | 243 Ohms 1%, 1/*W |

TABLE 1-continued

| REFERENCE NUMERAL | PART NUMBER |
|---|---|
| R7 | Potentiometer 100 K |
| R8 | 24.3 K ± 1%, ¼ W |
| R9 | 2.43 K ± 1%, ¼ W |
| R10 | 221 Ohms 1%, ¼ W |
| R11 | 24.3 K ± 1%, ¼ W |
| R12 | 1 K %, ¼ W |
| R13 | 14 K 1%, ¼ W |
| R14 | 100 Ohms 1%, ¼ W |
| R15 | 3.01 K 1%, ¼ W |
| R16 | 58.2 K ¼ W |
| R17 | Potentiometer 2.5 K |
| R18 | Potentiometer 5 K |
| R19 | 58.2 K ¼ W |
| R20 | 1 K %, ¼ W |
| R21 | 2.49 K ± 1%, ¼ W |
| R22 | 13 K 1% ¼ W |
| R23 | 11.3 K ± 1%, ¼ W |
| R24 | 12.1 K ± 1%, ¼ W |
| R25 | 3.01 K ± 1%, ¼ W |
| R26 | 2.49 K ± 1%, ¼ W |
| R27 | 820 Ohms %, ¼ W |
| R28 | 3.01 K ± 1%, ¼ W |
| R29 | 820 Ohms %, ¼ W |
| R30 | 58.2 K ¼ W |
| R31 | 58.2 K ¼ W |
| R32 | 11.3 K ± 1%, ¼ W |
| D1 | 1N4004 |
| D2 | 1N4148 |
| D3 | 1N4004 |
| D4 | 1N4004 |
| D5 | LED manufactured by General instruments part MV5752 or manufactured by Hewlitt-Packard HLMP 3315 |
| D6 | LED manufactured by General instruments part MV5752 or manufactured by Hewlitt-Packard HLMP 3315 |
| D7 | 1N4004 |
| C1 | .01 uF, 50 VDC |
| C2 | 220 uF electrolytic VDC |
| C3 | 47 uF electrolytic VDC |
| C4 | 4.7 uF electrolytic VDC |
| C5 | .022 uF, VDC, axial |
| C6 | .22 uF, VDC, axial |
| C7 | .22 uF, VDC, axial |
| C9 | .33 uF, 50 VDC |

I claim:

1. An electronic pilot positioner for use with a linear pneumatic actuator, the pilot positioner comprising:
    a solenoid mechanically connected to a valve which controls fluid in the actuator, the solenoid effecting the valve in response to a control signal;
    a feedback device capable of communicating with a linear output of the actuator;
    a control circuit coupled to the solenoid and the device, the control circuit receiving a first signal from the feedback device and a second signal from a central controller and generating the control signal in response to the first signal and the second signal;
    a module being separate from the actuator and housing the solenoid, the feedback device, and the control circuit; and
    a stroke circuit which effects the control circuit so that the control circuit generates the control signal in accordance with stroke criteria.

2. The positioner of claim 1, further comprising invertor means for inverting the second signal.

3. The pilot positioner of claim 1 wherein the feedback device is mechanically adjustable.

4. The pilot positioner of claim 1 wherein the feedback device includes a string and a plurality of pulleys.

5. The pilot positioner of claim 1 further including a hose clamp and wherein the module is mounted on the actuator by the hose clamp.

6. The positioner of claim 1 wherein the linear actuator has an external output and wherein the positioner further includes a cable and a wheel and wherein the external output of the actuator is connectable to the potentiometer by the cable and wheel.

7. The positioner of claim 6 wherein the wheel is spring loaded and wherein the wheel, the cable, and the potentiometer are configured so that the wheel turns when the output shaft is moved.

8. The positioner of claim 1 wherein the feedback device includes a wheel mechanism including a first wheel for a first stroke distance and a second wheel for a second stroke distance.

9. An electronic pilot positioner for use with a linear pneumatic actuator, the pilot positioner comprising:
a solenoid mechanically connected to a valve which controls fluid in the actuator, the solenoid effecting the valve in response to a control signal;
a feedback device capable of communicating with a linear output of the actuator;
a control circuit coupled to the solenoid and the device, the control circuit receiving a first signal from the feedback device and a second signal from a central controller and generating the control signal in response to the first signal and the second signal;
a module being separate from the actuator and housing the solenoid, the feedback device, and the control circuit; and
a home circuit which effects the control circuit so that the control circuit generates the control signal in accordance with home characteristics.

10. The pilot positioner of claim 9, further comprising a stroke circuit which effects the control circuit so that the control circuit generates the control signal in accordance with stroke criteria.

11. The positioner of claim 9, further comprising invertor means for inverting the second signal.

12. The pilot positioner of claim 2 wherein the feedback device is mechanically adjustable.

13. The pilot positioner of claim 9 wherein the feedback device includes a string and a plurality of pulleys.

14. The positioner of claim 9 wherein an output shaft of the linear actuator is an external output and wherein the positioner further includes a cable and a wheel and wherein the external output of the actuator is connectable to the potentiometer by the cable and wheel.

15. The positioner of claim 9 wherein the feedback device includes a wheel mechanism including a first wheel for a first stroke distance and a second wheel for a second stroke distance.

16. The pilot positioner of claim 14 wherein the wheel is spring loaded and wherein the wheel, the cable, and the potentiometer are configured so that the wheel turns when the output shaft is moved.

17. A positioner, comprising:
a pneumatic input for receiving a pneumatic fluid, the pneumatic input coupled to a supply valve;
a pneumatic output coupled to the supply valve and an exhaust valve for use with a pneumatic actuator;
a pneumatic exhaust coupled to the exhaust valve, the pneumatic exhaust providing a release for the fluid;
an electronic input for use with an electric control signal;
a feedback circuit in communication with the actuator, the circuit producing a signal representing the position of the actuator;
wherein the positioner adjusts the position of the actuator in a first direction by opening the exhaust valve in accordance with the signal from the feedback circuit and the electric control signal and in a second direction by closing the exhaust valve and opening the supply valve in accordance with the signal from the feedback circuit and the electric control signal; and
wherein the feedback circuit is coupled to a wheel mechanism including a first wheel for a first stroke distance and a second wheel for a second stroke distance.

18. The pilot positioner of claim 17 wherein the positioner further adjusts the position of the actuator in accordance with stroke criteria.

19. The pilot positioner of claim 17 wherein the positioner further adjusts the actuator in accordance with home characteristics.

* * * * *